US010013949B2

United States Patent
Yajima

(10) Patent No.: US 10,013,949 B2
(45) Date of Patent: *Jul. 3, 2018

(54) TERMINAL DEVICE

(71) Applicant: Sony Mobile Communications Japan, Inc., Minato-ku (JP)

(72) Inventor: Chikashi Yajima, Kanagawa (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 531 days.

This patent is subject to a terminal disclaimer.

(21) Appl. No.: 13/718,315

(22) Filed: Dec. 18, 2012

(65) Prior Publication Data

US 2013/0162566 A1  Jun. 27, 2013

Related U.S. Application Data

(60) Provisional application No. 61/578,745, filed on Dec. 21, 2011.

(51) Int. Cl.
*G09G 5/00* (2006.01)
*G06F 3/14* (2006.01)

(52) U.S. Cl.
CPC .......... *G09G 5/006* (2013.01); *G06F 3/1454* (2013.01); *G09G 2370/025* (2013.01); *G09G 2370/16* (2013.01)

(58) Field of Classification Search
CPC ............ G09G 5/006; G09G 2370/025; G09G 2370/16; G06F 3/1454

USPC ................................................. 345/156, 173
See application file for complete search history.

(56) References Cited

U.S. PATENT DOCUMENTS

| | | | |
|---|---|---|---|
| 6,718,063 B1* | 4/2004 | Lennon et al. | 382/224 |
| 8,405,729 B2* | 3/2013 | Jain | H04L 63/18 348/207.1 |
| 2003/0133159 A1* | 7/2003 | Grosso et al. | 358/1.18 |
| 2008/0310411 A1* | 12/2008 | Yamauchi et al. | 370/389 |
| 2010/0098397 A1* | 4/2010 | Yata | H04N 5/23212 396/124 |
| 2011/0016150 A1* | 1/2011 | Engstrom et al. | 707/778 |
| 2011/0087981 A1* | 4/2011 | Jeong et al. | 715/765 |
| 2011/0150280 A1* | 6/2011 | Tsuji | 382/103 |
| 2011/0267459 A1* | 11/2011 | Choi | G06K 9/228 348/135 |
| 2011/0295502 A1* | 12/2011 | Faenger | H04M 1/7253 701/431 |
| 2012/0144347 A1* | 6/2012 | Jo et al. | 715/863 |
| 2012/0208466 A1* | 8/2012 | Park et al. | 455/41.3 |

(Continued)

*Primary Examiner* — Afroza Chowdhury
(74) *Attorney, Agent, or Firm* — Oblon, McClelland, Maier & Neustadt, L.L.P.

(57) ABSTRACT

An information processing apparatus that controls a display to display captured image at a first portion of the display; detects whether an image of a specific pattern exists in the captured image; controls the display to display an image corresponding to data in a second portion of the display; detects that a user input was received at a first position corresponding to the first portion of the display and a second position corresponding to the second portion of the display; and transmits data corresponding to an image displayed at the first position to another information processing apparatus corresponding to the captured image displayed at the second position.

11 Claims, 9 Drawing Sheets

(56) References Cited

U.S. PATENT DOCUMENTS

2012/0287290 A1\* 11/2012 Jain ........................... 348/207.1
2013/0204939 A1\* 8/2013 Yajima ................... H04W 8/24
              709/204

\* cited by examiner

FIG. 3
| DICTIONARY IMAGE | TERMINAL IDENTIFICATION INFORMATION |
|---|---|
| D1  | MAC ADDRESS : 12 : 23 : 34 : 45 : 56 : 67 |
| D2  | MAC ADDRESS : 72 : 73 : 34 : 45 : 56 : 67 |
| D3 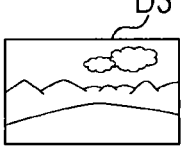 | SSID:XXXX1 |

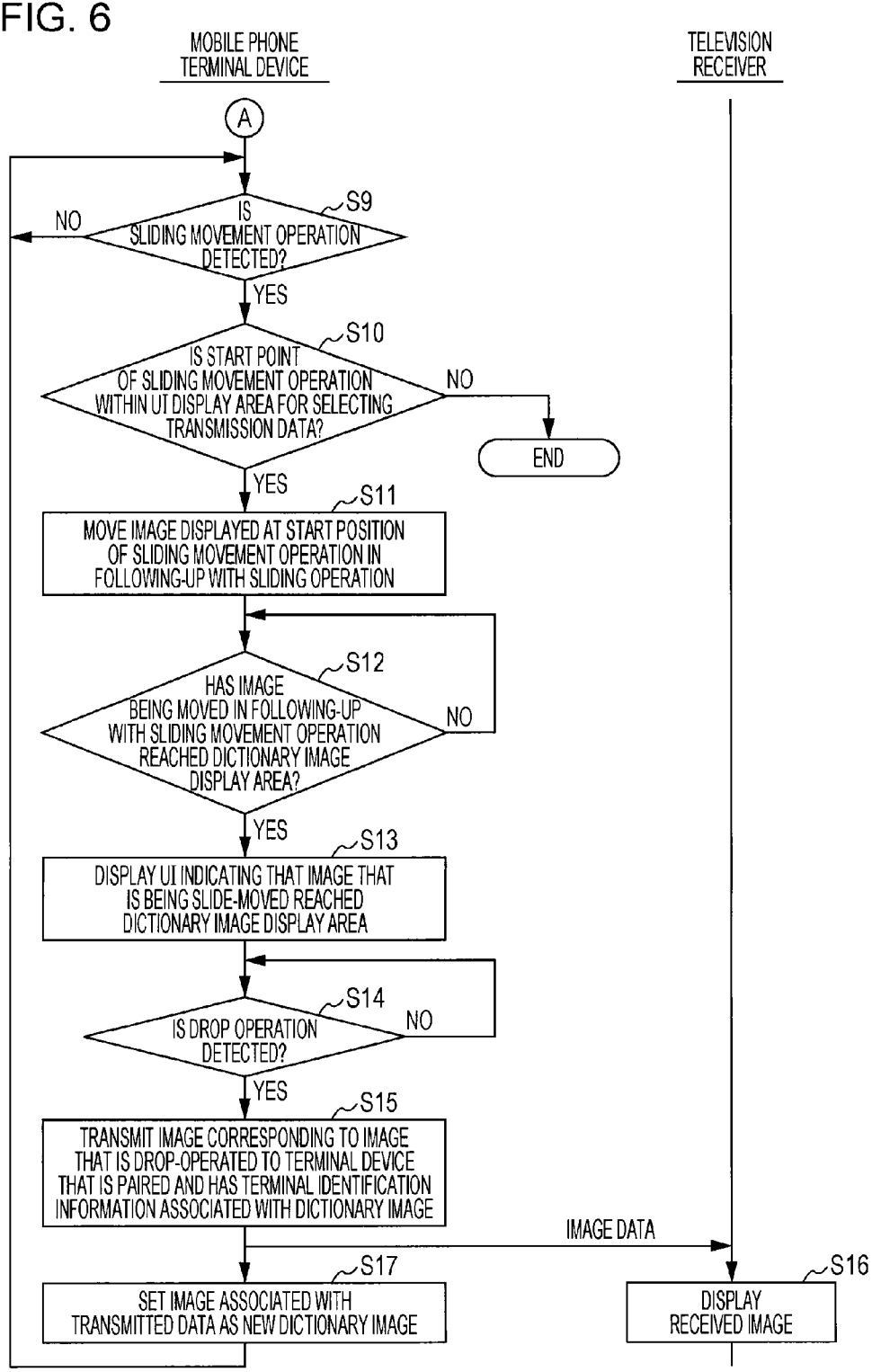

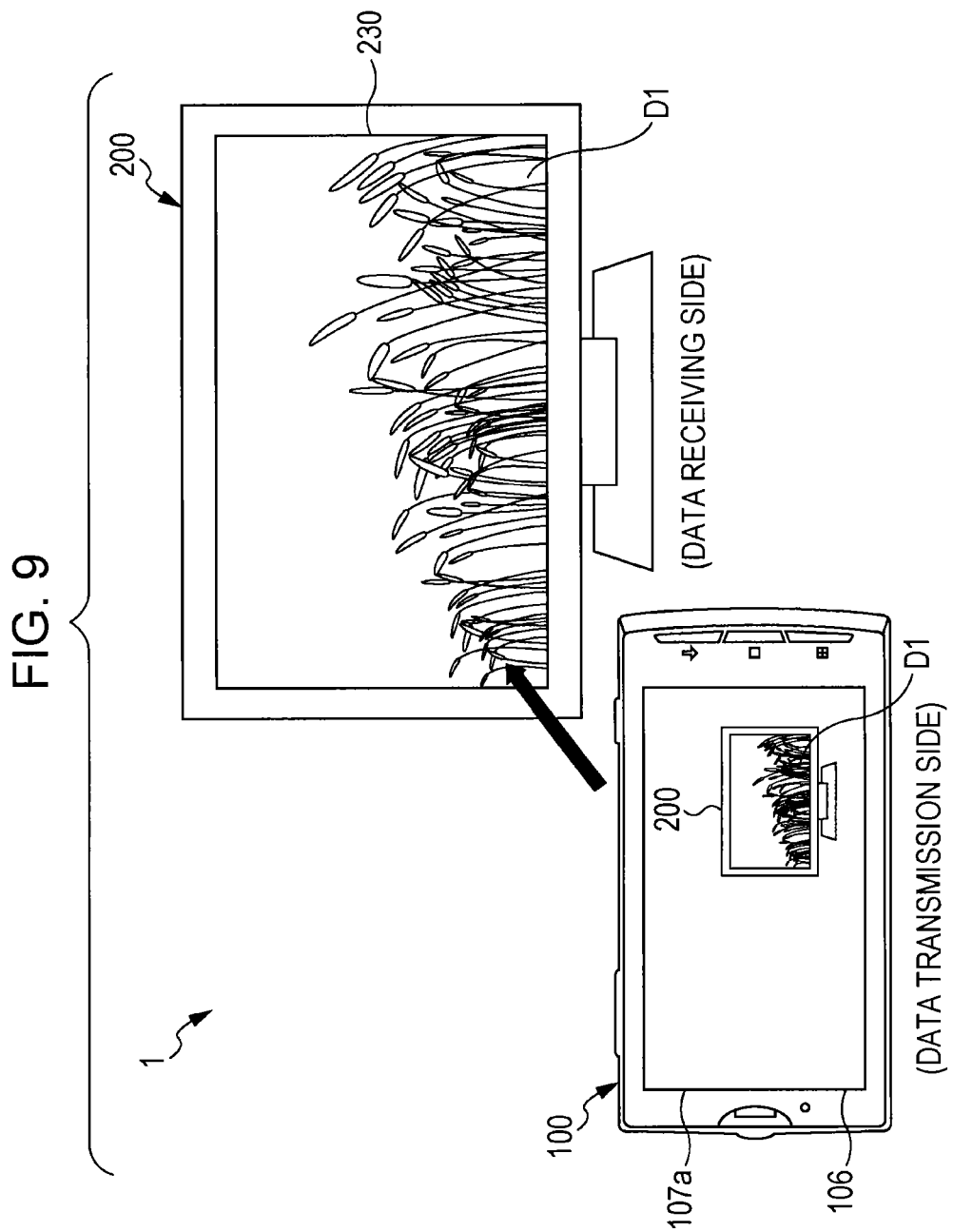

TERMINAL DEVICE

CROSS REFERENCE TO RELATED APPLICATION

The present application claims the benefit of the earlier filing date of U.S. Provisional Patent Application Ser. No. 61/578,745 filed on Dec. 21, 2011, the entire contents of which is incorporated herein by reference.

BACKGROUND

Field of the Disclosure

The present disclosure relates to a terminal device and, more particularly, relates to a technology for transmitting desired data from a terminal device to another terminal device through wireless communication.

Description of Related Art

In recent years, as communication among electronic devices, such as a mobile phone terminal device, a game machine, and a television receiver, for example, wireless communication, such as Bluetooth (registered trademark) or wireless LAN, has come to be increasingly used. Between devices that do not recognize each other, first, a process of pairing is performed, and setting information necessary for wireless communication is registered. When pairing is performed and connection for wireless communication is established, it becomes possible for the electronic devices for which pairing has been performed to transmit and receive various data, such as image data, moving image data, and voice data, through wireless communication. That is, if a plurality of electronic devices that are used by a user are paired in advance, it becomes possible for the plurality of devices to perform transmission and reception of data through wireless communication.

At the time of second and subsequent wireless communication, first, a search is made for a device that can be connected with a user's device, which exists in the area surrounding the user's device, and a device that is detected by the search and the user's device are automatically connected to each other. At this time, in a case where it is desired to transmit data to only some of the devices among the detected devices, it is necessary for the user to select devices for the object of data transmission by using a list of connectable devices. Some devices that have been wirelessly connected to the user's device recently make automatic connection to the user's device. However, also in a case where such a process is to be performed, when it is desired to transmit data to a device differing from a device that has been connected recently, it is also necessary for the user to select a desired device from a list of displayed paired devices.

However, it is common practice that, in the list of connectable devices, the connectable devices are displayed using the name of the device, the MAC address thereof, and the like. For this reason, there is a problem in that it is difficult, in practice, for the user to make a determination by himself/herself as to which of the devices that have been displayed as a list is the device that is the object of data transmission. In addition, there is a problem in that, to select data itself that is desired to be transmitted in addition to the device to which data is desired to be transmitted, it is necessary to access a folder that is managed in accordance with a hierarchical structure, or the like, which is troublesome.

As a technique for facilitating the transmission of data through wireless communication, for example, Japanese Unexamined Patent Application Publication No. 2004-147006 describes a technique in which transmission data that has been converted into two-dimensional code is displayed on a display screen in advance, and the image of the screen is captured using a camera of the device on the receiving side and converted back into the transmission data, thereby sending data.

SUMMARY

The inventors of the present disclosure have recognized the necessity of being capable of transmitting data with intuitive operation to a device capable of wireless communication, which exists in front of a user.

According to a first exemplary embodiment, the disclosure is directed to an information processing apparatus that controls a display to display captured image at a first portion of the display; detects whether an image of a specific pattern exists in the captured image; controls the display to display an image corresponding to data in a second portion of the display; detects that a user input was received at a first position corresponding to the first portion of the display and a second position corresponding to the second portion of the display; and transmits data corresponding to an image displayed at the first position to another information processing apparatus corresponding to the captured image displayed at the second position.

According to another exemplary embodiment, the disclosure is directed to a method performed by an information processing apparatus, the method including controlling a display to display captured image at a first portion of the display; detecting whether an image of a specific pattern exists in the captured image; controlling the display to display an image corresponding to data in a second portion of the display; detecting that a user input was received at a first position corresponding to the first portion of the display and a second position corresponding to the second portion of the display; and transmitting data corresponding to an image displayed at the first position to another information processing apparatus corresponding to the captured image displayed at the second position.

According to another exemplary embodiment, the disclosure is directed to non-transitory computer-readable medium including computer program instructions, which when executed by an information processing apparatus, case the information processing apparatus to control a display to display captured image at a first portion of the display; detect whether an image of a specific pattern exists in the captured image; control the display to display an image corresponding to data in a second portion of the display; detect that a user input was received at a first position corresponding to the first portion of the display and a second position corresponding to the second portion of the display; and transmit data corresponding to an image displayed at the first position to another information processing apparatus corresponding to the captured image displayed at the second position.

According to an embodiment of the present disclosure, it becomes possible to transmit data with intuitive operation to a device capable of wireless communication, which exists in front of a user.

BRIEF DESCRIPTION OF DRAWINGS

FIG. 3 is an illustration illustrating an example of correspondence between dictionary images and device information according to an embodiment of the present disclosure.

FIG. 6 is a flowchart illustrating an example of information processing performed by a communication system according to an embodiment of the present disclosure.

FIG. 9 is an illustration illustrating an example of the display of the screen of a mobile phone terminal device according to a modification of the present disclosure.

DETAILED DESCRIPTION

Examples of a terminal device, an image processing method, a program, and a communication system according to embodiments of the present disclosure will be described below in the following order with reference to the drawings.

Figure 1:
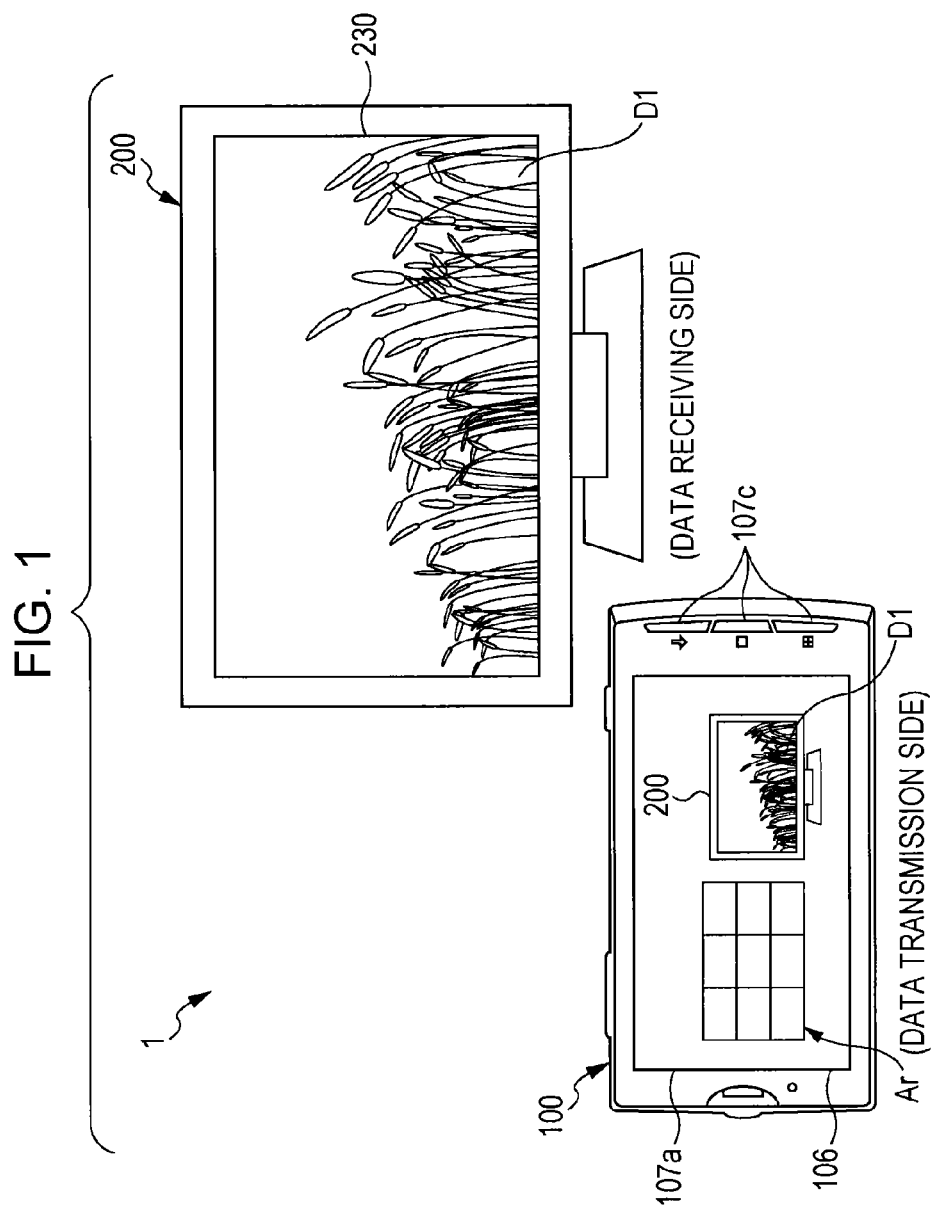
FIG. 1 is a schematic view illustrating an example of the configuration of a communication system according to an embodiment of the present disclosure.

1. Example of configuration of communication system
2. Example of configuration of mobile phone terminal device
3. Example of configuration of television receiver
4. Example of information processing in communication system
5. Modification 1. Example of Configuration of Communication System A communication system 1 shown in FIG. 1 is constituted by a mobile phone terminal device 100 and a television receiver 200. The mobile phone terminal device 100 and the television receiver 200 include a function of performing communication through short distance wireless communication, and perform transmission and reception of data with each other through short distance wireless communication. As standards for short distance wireless communication, for example, Bluetooth, Wi-Fi direct, Wireless HD (High Definition), WiGig (Wireless Gigabit), WHDI (Wireless Home Digital Interface), infrared, and NFC (Near Field Communication) can be used.

The mobile phone terminal device 100 includes a display unit 106 formed of LCD (Liquid Crystal Display), an organic EL (ElectroLuminescence) panel, or the like, and a touch panel 107a serving as a position input unit, which is stacked on or integrally formed with a display unit 106. On the display unit 106, an image captured by the image-capturing unit (not shown), and the like are displayed. It is assumed that, in the housing of the mobile phone terminal device 100, a lens that guides subject light to the image-capturing unit is provided on a side opposite to the side on which the display unit 106 is arranged.

In the example shown in FIG. 1, the image of the television receiver 200, which is captured by the image-capturing unit, is displayed on the screen of the display unit 106. To the left of the image, a thumbnail of an image of data (or data that exists in a network (cloud)), which is stored in the mobile phone terminal device 100, is displayed as a virtual object body Ar. In a case where the term "cloud" is used in the present specification, it indicates a use form of cloud computing that obtains data from a server on the Internet or from another terminal device.

FIG. 1 illustrates, as an example, a case in which data (or data that exists in the cloud) stored in the mobile phone terminal device 100 is image data, and the image indicating the image data is image data itself. More specifically, in the example shown in FIG. 1, each image displayed as a virtual object body Ar indicates image data itself in the mobile phone terminal device 100 (or image data itself in the cloud). However, moving image data, voice data, or the like, in addition to image data itself which can be displayed as an image, can also be transmitted to another terminal device by an image processing method of the present disclosure.

In a case where the data (or data that exists in the cloud) stored in the mobile phone terminal device 100 is voice data or moving image data, it is assumed that a photograph, an image, a mark, and the like, which indicates the content of the data, can be set as the data to be an image associated with the actual data.

The television receiver 200 includes a display unit 230 formed of an LCD, a PDP (Plasma Display Panel), an organic EL panel, or the like. On the display unit 230, an image and the like, which are transmitted from the mobile phone terminal device 100 through short distance wireless communication are displayed. In the communication system 1 shown in FIG. 1, it is assumed that the mobile phone terminal device 100 is on the data transmission side, and the television receiver 200 is on the data receiving side.

According to the communication system 1, in a case where an operation described below is input from the user, the data that is selected by the user is transmitted from the mobile phone terminal device 100 to the television receiver 200 through short distance wireless communication.

(1) An operation of selecting any of the images displayed as a virtual object body Ar in a portion of the screen of the mobile phone terminal device 100 with a touch or the like (2) An operation of causing the image selected in (1) to be dragged and dropped (slide) to the position of the television receiver 200 displayed on the same screen At this time, the data that is associated in advance with the image selected by the user in (1) is transmitted from the mobile phone terminal device 100 to the television receiver 200 through short distance wireless communication.

In the present embodiment, an example is given in which the terminal devices forming the communication system 1 are the mobile phone terminal device 100 and the television receiver. However, the embodiment is not limited to this. Another terminal device, such as a personal computer, a tablet terminal, a game machine, or an audio player, can be used as long as it has a short distance wireless communication function.

2. Example of Configuration of Mobile Phone Terminal Device

Figure 2:
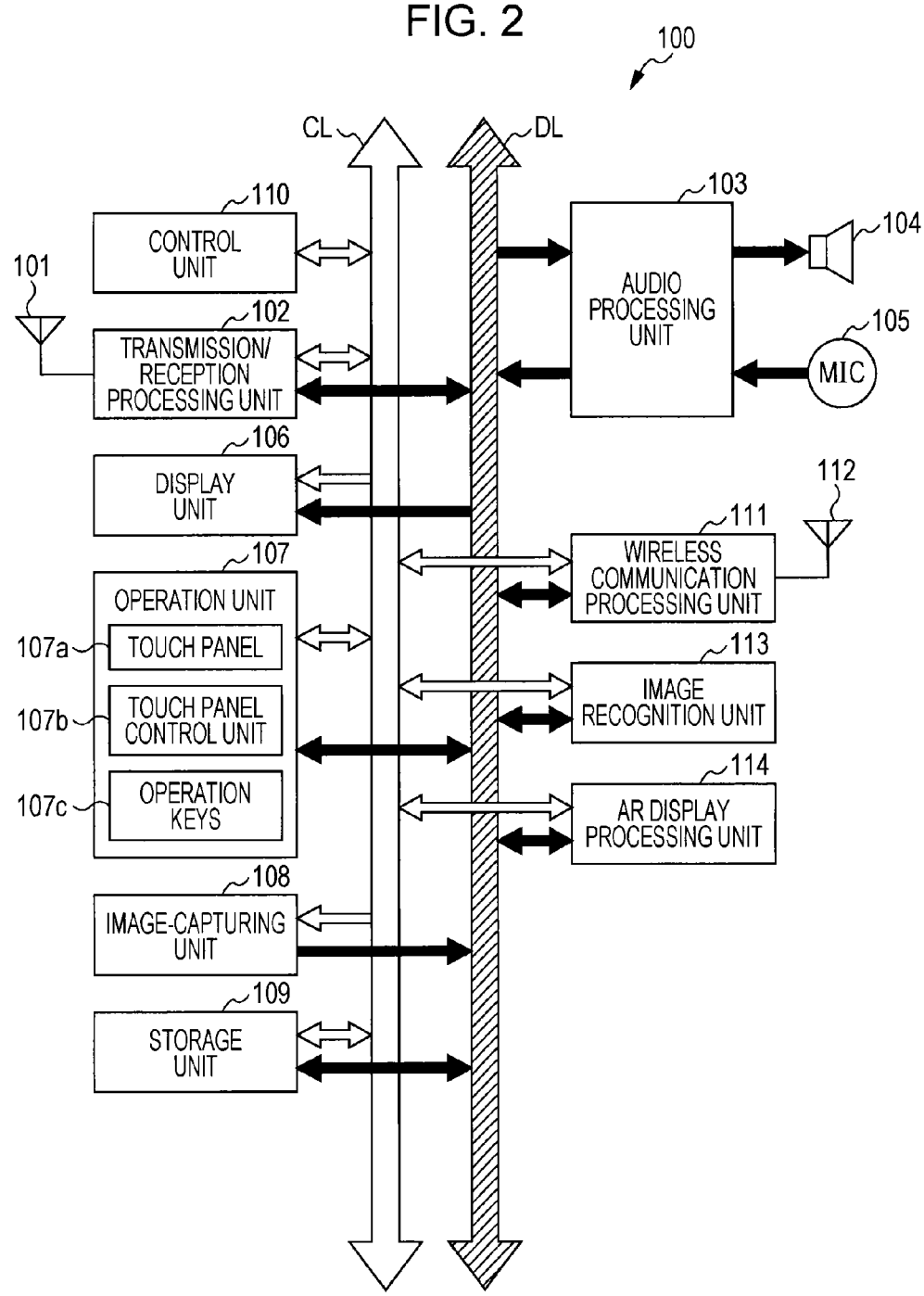
FIG. 2 is a block diagram illustrating an example of the configuration of a mobile phone terminal device according to an embodiment of the present disclosure.

Next, a description will be given, with reference to FIG. 2, of an example of the configuration of the mobile phone terminal device 100. The mobile phone terminal device 100 includes an antenna 101 through which transmission and reception of radio waves are performed with a base station for wireless telephone, a transmission and reception processing unit 102 to which the antenna 101 is connected, and a control unit 110. Furthermore, the mobile phone terminal includes an audio processing unit 103, a speaker 104, and a microphone 105.

The transmission and reception processing unit 102 performs wireless communication with the base station for wireless telephone under the control of the control unit 110. At the time of a voice call, voice data contained in the data received by the transmission and reception processing unit 102 is supplied to the audio processing unit 103. Then, the audio processing unit 103 performs a process for decoding the voice data so as to obtain an analog audio signal. The analog audio signal obtained by the audio processing unit 103 is supplied to the speaker 104 and is output as sound. The audio signal obtained by the microphone 105 by collecting sound is also supplied to the audio processing unit 103, and is coded into voice data in a predetermined coding format by the audio processing unit 103. Then, the obtained voice data is supplied to the transmission and reception processing unit 102 and is transmitted as a wireless radio wave through the antenna 101. Furthermore, the transmission and reception processing unit 102 also performs a wireless communication process when making a connection to the Internet.

The processing units, such as the transmission and reception processing unit 102 and the audio processing unit 103, perform transmission and reception of control data to and from the control unit 110 through a control line CL, and also perform the transmission of data thereto through a data line DL.

Furthermore, as described above, the mobile phone terminal device 100 includes the display unit 106 and the touch panel 107a. The display on the display unit 106 is controlled by the control unit 110. On the display unit 106, information necessary at the time of making a telephone call and receiving a telephone call, information such as the destination of electronic mail and a message, an image obtained by being connected to the Internet, information obtained in consequence of the execution of various functions provided in the mobile phone terminal device 100, and the like are displayed. For example, an image captured by the image-capturing unit 108 (to be described later), and the like are displayed.

The touch panel 107a is formed as one of the operation units 107 together with operation keys 107c (see FIG. 1) provided in the housing of the mobile phone terminal device 100. The control of the touch panel 107a is performed by the touch panel control unit 107b. In a case where, for example, there is an operation input from the user to the touch panel 107a, the touch panel control unit 107b generates an instruction signal corresponding to the content of the input operation, and supplies the instruction signal to the control unit 110.

The image-capturing unit 108 includes an image sensor formed of, for example, a CCD (Charge Coupled Device) and a CMOS (Complementary Metal Oxide Semiconductor). The image-capturing unit 108 performs photoelectric conversion on subject light that is formed as an image on the light-receiving surface thereof through a lens (not shown), and outputs an image signal. The generation of the image signal is performed at a predetermined frame rate, such as, for example, 30 fps (frames per second), and the generated image signal is stored as a recorded image in the storage unit 109 (to be described later) and the like. Furthermore, the image signal generated by the image-capturing unit 108 is also supplied to the image recognition processing unit 113 (to be described later).

As shown in FIG. 1, in a case where the user performs an operation of moving the mobile phone terminal device 100 in near the direction of the television receiver 200, the television receiver 200 is displayed in the lens arranged on the rear side of the housing of the mobile phone terminal device 100. Then, an image signal in which the television receiver 200 is a subject is generated by the image-capturing unit 108 and is transmitted to the image recognition processing unit 113. In a case where, as shown in FIG. 1, a predetermined image is displayed on the display unit 230 of the television receiver 200, the information on the image displayed on the screen of the television receiver 200 is contained in the image signal generated by the image-capturing unit 108.

The control unit 110 is formed of a microprocessor and the like, and performs communication control, audio processing, the control thereof, image processing, the control thereof, the control of other various signal processing, the control of each unit, and the like. Specifically, the control unit 110 performs the control of the transmission of a predetermined image as an image of a specific pattern to the television receiver 200 at a timing at which pairing is established in short distance wireless communication. For the image to be transmitted to the television receiver 200 at this timing, for example, the control unit 110 selects any desired image from among the images stored in the storage unit 109 (to be described later). The image of the specific pattern, which is selected and transmitted by the control unit 110, is used in reference as a dictionary image at the time of image recognition by the image recognition processing unit 113 (to be described later). Accordingly, in the following description, the image of the specific pattern will be referred to as a "dictionary image".

The control unit 110 manages the dictionary images transmitted to the television receiver 200 and the terminal identification information of the television receiver 200 so that they are associated with each other. More specifically, the control unit 110 manages the dictionary images and the terminal identification information of the terminal device that transmitted the dictionary image so that they are associated with each other. In a case where there are a plurality of terminal devices that transmitted the dictionary images, the sets of the dictionary images and the terminal identification information are managed by a number corresponding to the number of terminal devices that transmitted the dictionary images.

FIG. 3 illustrates an example of association between dictionary images, and terminal identification information, which is performed by the control unit 110. In the example shown in FIG. 3, a dictionary image D1 is associated with a MAC address "12:23:34:45:56:67". Furthermore, a dictionary image D2 is associated with a MAC address "72:73:34:45:56:67". Furthermore, a dictionary image D3 is associated with SSID "XXXX1". In a case where the terminal device that transmitted the dictionary image is in compliance with a plurality of wireless communication standards, a plurality of pieces of terminal identification information are provided in such a manner as to correspond to each wireless communication standard. Then, in such a case, it is necessary for the control unit 110 to manage the information on the type of the wireless communication standard together with the terminal identification information so that they are associated with the dictionary image.

Referring back to FIG. 2, the description will be continued. The storage unit 109 is connected to the control unit 110 through the control line CL and the data line DL. In the storage unit 109, various data items necessary for the mobile phone terminal device 100 are stored. Furthermore, in the storage unit 109, an image or a moving image captured by the image-capturing unit 108 (to be described later), and an audio file, a moving image file, and an image file downloaded from the cloud, and the like are stored.

Furthermore, the mobile phone terminal device 100 includes a wireless communication processing unit 111 to which an antenna 112 is connected, an image recognition processing unit 113, and an AR display processing unit 114 serving as a virtual object body display processing unit. The wireless communication processing unit 111 performs wireless-based communication with devices in the surrounding area through the antenna 101 in accordance with a procedure based on a predetermined communication standard. It is assumed in the present embodiment that the wireless communication processing unit 111 performs wireless communication in accordance with a standard, such as, for example, Bluetooth or Wi-Fi direct described above. The mobile phone terminal device 100 may be connected to the Internet through wireless communication by the wireless communication processing unit 111.

The image recognition processing unit 113 performs image recognition by using, as an input image, an image signal that is input at a frame rate, such as 30 fps, from the image-capturing unit 108. Specifically, the image recognition processing unit 113 scans the image generated using the image signal input from the image-capturing unit 108, and determines whether or not a pattern that is the same as the dictionary image exists among the images. Then, in a case where the same pattern is detected, the coordinates on the display screen of the detected image are supplied to the AR display processing unit 114.

As described above, in a case where the user has performed an operation of moving the mobile phone terminal device 100 near the television receiver 200, which is a party to which data is desired to be transmitted, the image captured by the image-capturing unit 108 contains the dictionary image displayed on the display unit of the television receiver 200. More specifically, in the image recognition processing unit 113, it is determined whether or not the dictionary image displayed on the display unit 230 (see FIG. 1) of the television receiver 200 matches the dictionary image that has already been transmitted to the television receiver 200.

The AR display processing unit 114 generates a virtual object body Ar, and displays the generated virtual object body Ar in an area other than an area (second area) in which the image detected by the image recognition processing unit 113 has been displayed. In the example shown in FIG. 1, the virtual object body Ar is displayed to the left of the area (first area) in which the dictionary image D1 has been displayed. As the virtual object body Ar, for example, images indicating data stored in the storage unit 109 or data obtainable from the cloud are displayed as a list formed of a plurality of rows and columns. This virtual object body Ar is formed in such a manner as to display images and also in such a manner as to be capable of being operated with a touch or the like. More specifically, in a case where an operation, such as a touch, is input by the user, the AR display processing unit 114 outputs the coordinate information in the virtual object body AR at the selected place to the control unit 110.

In the control unit 110 receiving the coordinate information, a process for identifying the image displayed at the position corresponding to the coordinate information is performed on the basis of the input coordinate information. Together with this, the control unit 110 also performs a process for displaying the identified image together with a frame and moving the image with the frame in following-up with the sliding movement operation using a finger of the user or an indicator. In addition, when the display position of the image that is moving in following-up with the sliding movement is positioned within the second area, the control unit 110 also performs a process for changing the color of the frame. The image movement process and the frame display process, which are performed by the control unit 110, will be described later with reference to FIG. 7. Here, an example in which the frame display process is performed by the control unit 110 is given. Alternatively, the frame display process may be performed by the AR display processing unit 114.

Furthermore, the control unit 110 performs control such that, when a sliding movement operation in which the first area is used as a starting point and the second area is used as an end point is input by the user, the control unit 110 causes the wireless communication processing unit 111 to transmit data corresponding to the image displayed at the position of the starting point of the operation by using the terminal identification information associated with the dictionary image displayed in the second area.

3. Example of Configuration of Television Receiver

Figure 4:
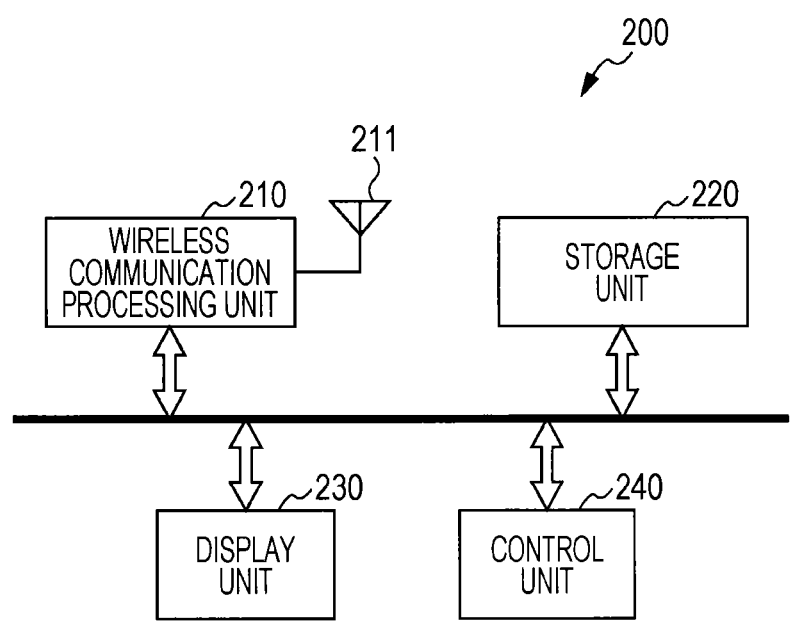
FIG. 4 is a block diagram illustrating an example of the configuration of a television receiver according to an embodiment of the present disclosure.

Next, a description will be given, with reference to FIG. 4, of an example of the configuration of the television receiver 200 serving as a terminal device on the side (data receiving side) on which data is transmitted. In order to facilitate the description, in FIG. 4, only the unit that performs the image processing method of the present disclosure is extracted and described, and descriptions of functions of a tuner, a signal processing circuit, and the like, which are included in a typical television receiver, are omitted.

The television receiver 200 includes a wireless communication processing unit 210, a storage unit 220, a display unit 230, and a control unit 240. The wireless communication processing unit 210 performs wireless-based communication with devices in the surrounding area in which pairing has already been performed through an antenna 211 in accordance with a procedure based on a predetermined communication standard.

The storage unit 220 is formed of an HDD (Hard disk drive), a Blue-ray (registered trademark) disc, and the like, in which programs of television broadcasts, which are received by a tuner (not shown), data received through wireless communication by the wireless communication processing unit 210, and the like are stored.

The display unit 230 is formed of an LCD, a PDP (Plasma Display Panel), an organic EL panel, or the like, on which programs received by a tuner, various data stored in the storage unit 220, dictionary images received through the wireless communication processing unit 210, and the like are displayed.

The control unit 110 is formed of a microprocessor or the like, and performs communication control, audio processing, the control thereof, image processing, the control thereof, the control of other various signal processing, the control of each unit, and the like. In a case where dictionary images are transmitted from the mobile phone terminal device 100, the control unit 110 performs control of displaying the received dictionary images on the display unit 230.

5. Example of Image Processing in Communication System

Figure 5:
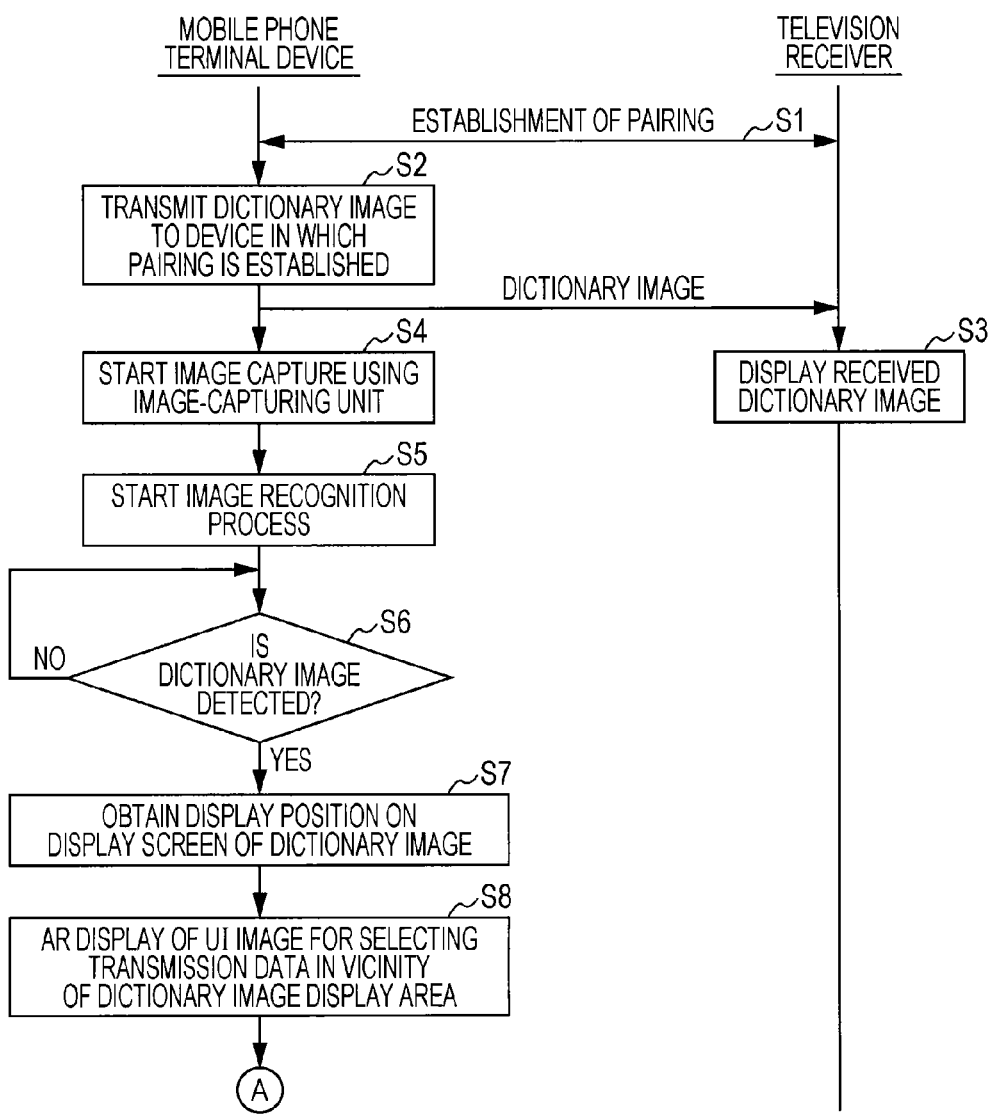
FIG. 5 is a flowchart illustrating an example of information processing performed by a communication system according to an embodiment of the present disclosure.

Next, a description will be given, with reference to the flowchart of FIG. 5, of an example of an information processing flow in the communication system 1 formed of the mobile phone terminal device 100 and the television receiver 200 described above. First, pairing in wireless communication is established between the mobile phone terminal device 100 and the television receiver 200 (step S1). When the pairing is established, any desired dictionary image is transmitted through short distance wireless communication from the mobile phone terminal device 100 on the data transmission side to the television receiver 200 on the data receiving side, which is a party with which the pairing has been established (step S2).

In the television receiver 200, when the dictionary image transmitted through short distance wireless communication is received, the received dictionary image is displayed on the screen of the display unit 230 (see FIG. 4) (step S3). Next, in the mobile phone terminal device 100, image capture by the image-capturing unit 108 (see FIG. 2) is started (step S4), and along with this, an image recognition process by the image recognition processing unit 113 is also started (step S5). The image recognition process referred to herein refers to processing in which the image generated using the image signal input from the image-capturing unit 108 is scanned, and it is determined whether or not the same pattern as that of the dictionary image exists among the images. The image recognition process by the image recognition processing unit 113 is performed each time the image generated using the image signal that is input from the image-capturing unit 108 is changed.

Then, the image recognition processing unit 113 determines whether or not a dictionary image has been detected (step S6), and the determination of step S6 is repeatedly performed until a dictionary image is detected. When the dictionary image has been detected, the display position in the screen of the display unit 106 of the detected dictionary image is obtained as coordinates (step S7). Then, a process for AR-displaying a UI image (User Interface) for selecting transmission data in the vicinity of the dictionary image display area in which the dictionary image has been detected is performed by the AR display processing unit 114 (see FIG. 2) (step S8), and the process proceeds to connection element A.

Figure 7A:
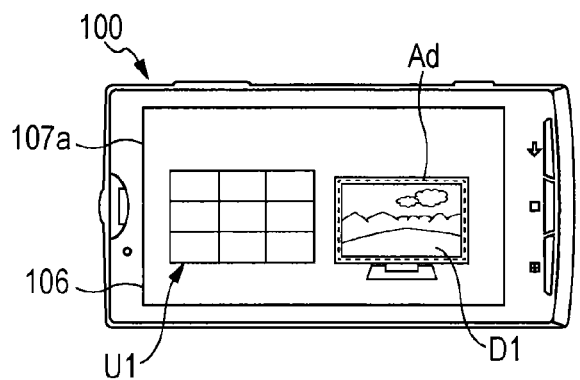
FIGS. 7A-7D are illustrations illustrating an example of screen transition of a mobile phone terminal device according to an embodiment of the present disclosure.

FIG. 7A illustrates an example of the display of a UI image U1 for selecting transmission data. As a result of the process of step S8 of FIG. 5 being performed, the UI image U1 for selecting transmission data is displayed as an AR to the left of a dictionary image display area Ad on the screen of the display unit 106 of the mobile phone terminal device 100. For the UI image U1 for selecting transmission data, images indicating each data item stored in the storage unit 109 (see FIG. 2) and each data item obtainable from the cloud are displayed in a 3×3 array.

Next, processing after the connection element A shown in FIG. 5 will be described with reference to the flowchart of FIG. 6. First, it is determined whether or not a sliding movement operation has been performed on the touch panel 107a (step S9). While the sliding movement operation is not detected, the determination of step S9 is continued. In a case where the sliding movement operation has been detected, it is determined whether or not the sliding movement operation has been performed by using any position within the display area of the UI image U1 for selecting transmission data as a starting point (step S10). In a case where the sliding movement has not started from any position within the display area of the UI image U1 for selecting transmission data, the processing is completed.

Figure 7B:
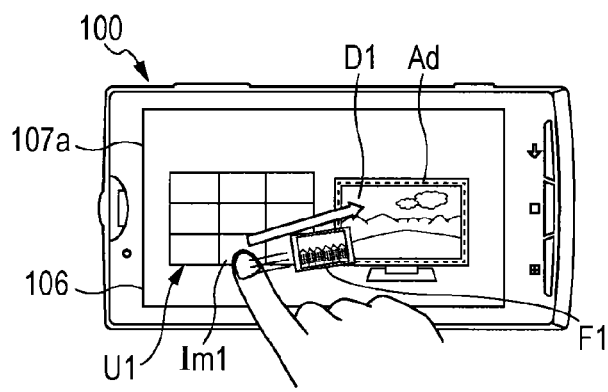

When the sliding movement operation has started from any position within the display area of the UI image U1 for selecting transmission data, a process for making the image displayed at the starting point position follow up with the sliding movement operation and displaying the image in the path of the sliding movement operation is performed (step S11). FIG. 7B illustrates an example of the display screen of the mobile phone terminal device 100 in a case where the process of step S11 of FIG. 5 has been performed. FIG. 7B illustrates a state in which an image Im1 is selected from among the UI images U1 for selecting transmission data with a finger of the user, and the selected image Im1 is moved in following-up with the sliding movement.

Referring back to FIG. 6, the description will be continued. Next, it is determined whether or not the image that is displayed in following-up with the sliding movement has reached the dictionary image display area (step S12). More specifically, it is determined whether or not the display position of the image Im1 on the screen, shown in FIG. 7B, which is moved in consequence of the sliding movement has come near the dictionary image display area Ad. While the image Im1 that is displayed in following-up with the sliding movement does not reach the dictionary image display area Ad, the determination of step S12 is continued.

Figure 7C:
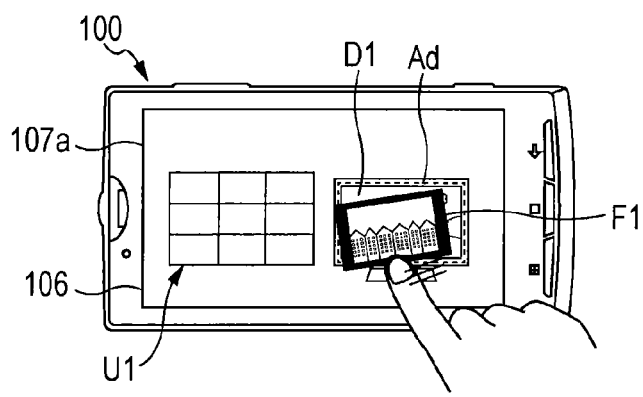

In a case where the image displayed in following-up with the sliding movement has reached the dictionary image display area Ad, a process for displaying a UI indicating that the image that has been made to slide has reached the dictionary image display area Ad is performed (step S13). In the example shown in FIG. 7, the image Im1 that is displayed and moved by the sliding movement is encircled with a frame. The color of the frame is changed depending on whether the image Im1 has reached the dictionary image display area Ad or not. In the case where the image Im1 has not yet reached the dictionary image display area Ad, as shown in FIG. 7B, a frame F1 is displayed in white, and in the case where the image Im1 has reached the dictionary image display area Ad, as shown in FIG. 7C, the color of the frame F1 is changed to black.

Referring back to FIG. 6, the description will be continued. Next, it is determined whether or not a drop operation by the user has been detected (step S14), and while the drop operation is not detected, the determination of step S14 is continued. In a case where the drop operation has been detected, data associated with the image on which a drop operation has been performed is transmitted through short distance wireless communication to the terminal device that has already been paired and that has terminal identification information associated with the dictionary image detected in the image recognition process (step S15).

It is assumed in the present embodiment that the terminal device that has already been paired and that has terminal identification information associated with the dictionary image is the television receiver 200. Furthermore, the data associated with the image on which a drop operation has been performed is image data. In such a case, as a result of the process of step S15 being performed, image data is transmitted through short distance wireless communication from the mobile phone terminal device 100 to the television receiver 200.

Figure 7D:
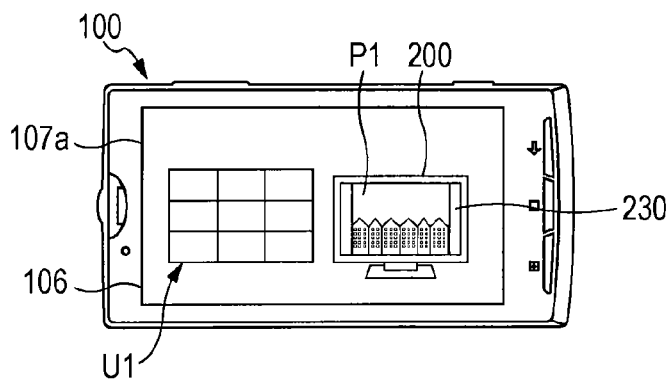

In the television receiver 200, a process for displaying the received data (here, image data) on the screen of the display unit 230 (see FIG. 4) is performed (step S16). FIG. 7D illustrates, as an example, a state in which, as a result of the process of step S16 being performed, an image P1 has been displayed on the screen of the display unit 230 of the television receiver.

Next, in the mobile phone terminal device 100, a process for setting the image associated with the data transmitted to the television receiver 200 in step S15 as a new dictionary image is performed (step S17). More specifically, a process, shown in FIG. 3, for overwriting the dictionary image associated with the terminal identification information with the image associated with the data transmitted to the television receiver 200 is performed.

As a result of such processing being performed, it becomes possible to continuously transmit new data selected in the UI image U1 for selecting transmission data to the television receiver 200 having the terminal identification information associated with the overwritten dictionary image.

Figure 8A:
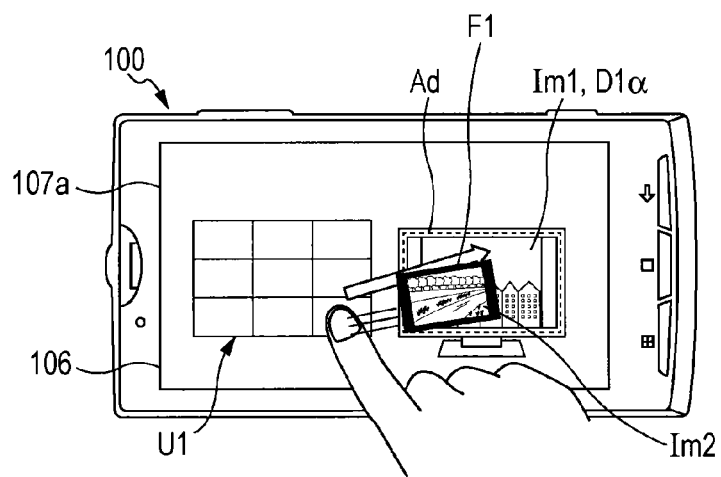
FIGS. 8A and 8B are illustrations illustrating an example of screen transition of a mobile phone terminal device according to an embodiment of the present disclosure.

FIG. 8 illustrates an example of screen transition of the mobile phone terminal device 100 in a case where new data is to be transmitted by using the overwritten dictionary image. FIG. 8A illustrates a state in which the screen of the television receiver 200 is displayed on the screen of the display unit 106 of the mobile phone terminal device 100. On the screen of the television receiver 200, an image Im2 corresponding to the data transmitted from the mobile phone terminal device 100 is displayed. In FIG. 8A, an image such that many houses are built side by side is displayed as the image Im2. This image Im2 is managed as a new dictionary image D1α by the control unit 110 of the mobile phone terminal device 100.

Figure 8B:
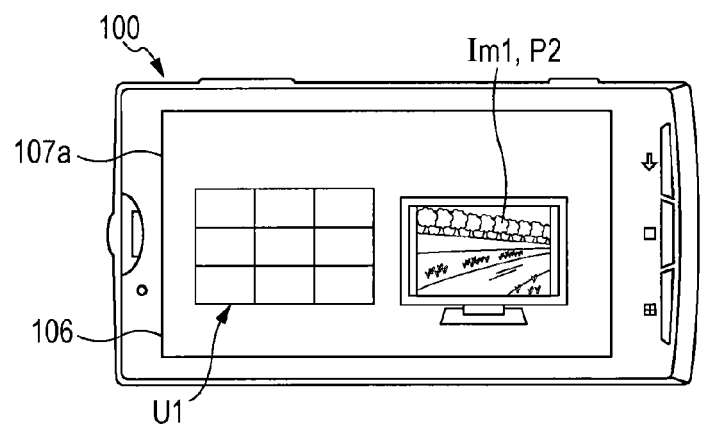

Therefore, as shown in FIG. 8A, in a case where an operation of dragging and dropping the image Im2 (image of rape blossoms field) within the UI image U1 for selecting transmission data to the dictionary image display area Ad is input, actual image data P2 associated with the image Im2 is transmitted to the television receiver 200. Then, as shown in FIG. 8B, on the screen of the television receiver 200, the image Im2 (here, the image data P2 itself: image of rape blossoms field) corresponding to the image data P2 is displayed. As described above, by performing a process for overwriting the dictionary image with the image corresponding to the data that has been actually transmitted, it becomes possible to repeatedly perform data transmission from the transmission source to the transmission destination.

According to the embodiment of the present disclosure described above, by only holding the user's terminal device so that the display screen of the terminal device to which data is desired to be transmitted is displayed on the display screen of the user's terminal device, it is possible to identify a desired terminal device as the transmission destination of the data. In addition, by only selecting the data desired to be transmitted with a touch or the like from among the UI images U1 for selecting transmission data displayed as AR on the screen and causing the data to slide to a place in which the terminal device of the transmission destination is displayed, it is possible to transmit desired data to the desired terminal device.

More specifically, an action of transmitting desired data to be transmitted to a terminal device which is actually in front of the user, and an operation in which the user's terminal device is held in the direction of the terminal device to which data is desired to be transmitted and an image displayed as an AR, which is associated with specific data, is moved in the direction of the terminal device displayed on the screen are synonymous. As a result, it is possible for the user to transmit desired data to a desired terminal device with intuitive and easy operation.

Furthermore, also in a case where there are a plurality of terminal devices that have already been paired in the surrounding area, it is possible to select the terminal device of the transmission destination by only performing an operation of moving the user's terminal device in the direction of the terminal device to which data is desired to be transmitted. Therefore, it is not necessary for the user to perform a complex procedure of selecting a device to which data is desired to be transmitted from among the names of the devices displayed in a list, and MAC addresses.

Furthermore, according to the embodiment of the present disclosure described above, in a case where an operation of dragging any desired image in the UI images U1 for selecting transmission data is input, an image that is moved in following-up with the sliding movement is displayed together with a frame. In addition, in a case where the image that is being moved reaches the dictionary image display area as a result of the sliding movement, the color of the frame that encloses the image changes. As a result, it is possible for the user to visually understand the position at which the image that is being made to slide (dragged) may be dropped. Therefore, the user becomes able to perform the action of transmitting desired data to a desired terminal device without a mistake through a UI that is visually easy to understand.

In addition, according to the embodiment of the present disclosure described above, the dictionary image is overwritten with an image corresponding to the data that has been actually transmitted. In consequence, it becomes possible to perform, many times, an operation of "moving the image displayed as an AR associated with the specific data in the direction of the terminal device displayed on the screen". More specifically, it becomes possible to send, many times, desired data to a desired terminal device.

6. Modification

In the above-described embodiment, the selection of the data desired to be transmitted and the selection of the transmission destination are performed by an operation of sliding movement (dragging and dropping) of a finger of the user or an indicator. However, the embodiment is not limited to this. For example, in a case where an operation of touching any desired image in the UI images U1 for selecting transmission data, and any place within the dictionary image display area Ad is input, data associated with the image selected by the touch may be transmitted to the terminal device that is displaying the dictionary image selected with the touch.

Furthermore, in the above-described embodiment, an example is given in which the UI image U1 for selecting transmission data is displayed to the left of the dictionary image display area Ad. However, the embodiment is not limited to this position. Any area may be used as long as it is an area other than the dictionary image display area Ad. For example, an image associated with the actual data may be displayed as an AR in such a manner as to enclose the dictionary image display area Ad.

Furthermore, in the above-described embodiment, an example in which an image that is being slide-moved (drag) is displayed together with a white frame F1, and when the image reaches the dictionary image display area Ad, the color of the frame F1 is changed to black, has been given. However, the embodiment is not limited to this. At a timing at which the dictionary image display area Ad is reached, a pattern rather than the color of the frame F1 may be changed, or the frame F1 may be made to blink. Alternatively, the frame F1 may not be provided, and the display itself of an image I may be changed. For example, a process for superposing a specific mark on the image I and displaying it, for displaying the image I with a specific color, or for making the image I itself to blink may be performed.

Furthermore, in the above-described embodiment, an example in which the timing at which a dictionary image is transmitted from the terminal device on the data transmission side to the terminal device on the receiving side is after pairing is established has been given. However, the embodiment is not limited to this. For example, a dictionary image may be transmitted at a phase in which pairing is performed. Specifically, the mobile phone terminal device 100 that is the data transmission source transmits respectively different dictionary images to all the detected terminal devices at a phase at which a connectable device is searched for. In the mobile phone terminal device 100, it is sufficient that the transmitted dictionary images and the terminal identification information of the terminal device of the transmission destination are managed so that they are associated with each other.

In addition, as a result of configuring the terminal device receiving the dictionary image so as to display the received dictionary image on the display screen, it becomes possible to use the dictionary image as a means for pairing. FIG. 9 illustrates an example of the screen display of the display unit 106 of the mobile phone terminal device 100 in the case of being configured in this manner. Components in FIG. 9, which correspond to those of FIG. 1, are designated with the same reference numerals, and repeated descriptions are omitted.

On the screen of the display unit 230 of the television receiver 200 on the data receiving side, the received dictionary image D1 is displayed. In this state, by moving the mobile phone terminal device 100 in the direction of the television receiver 200, an image of the television receiver 200 is captured through a lens (not shown) provided on the rear side of the housing of the mobile phone terminal device 100, and the captured image is displayed on the display unit 106. At this time, an image signal obtained by capturing the dictionary image D1 is input to the image recognition processing unit 113 (see FIG. 2) of the mobile phone terminal device 100. Therefore, the image recognition process allows a pattern that is the same as that of the dictionary image from among the images by the image signal obtained by the image capture to be detected.

At this timing, if processing sharing a link key or the like in, for example, Bluetooth is performed between the television receiver 200 that is displaying dictionary images and the mobile phone terminal device 100, pairing between both the terminal devices is established. As a result of being configured and processed in this manner, it becomes possible to identify a desired terminal device by using the dictionary images not only at a stage in which the transmission of data is performed, but also at a stage in which pairing is performed.

The series of processing in the above-described embodiment can be performed by hardware, and can also be performed by software. When the series of processing is to be performed by software, the series of processing can be performed by a computer in which the program forming the software has been incorporated into dedicated hardware or by a computer in which the program for executing various functions has been installed.

Furthermore, a recording medium having recorded thereon program code of software for implementing the functions of the above-described embodiment may be supplied to a system or a device. Furthermore, of course, the functions can also be realized by reading and executing program code stored on a recording medium by the computer (or a control device, such as a CPU) of the system or the device.

Examples of usable recording media for supplying program code in this case include a flexible disk, a hard disk, an optical disc, a magneto-optical disc, a CD-ROM, a CD-R, a magnetic tape, a non-volatile memory card, and a ROM.

Furthermore, the functions of the above-described embodiment can be realized by executing the read program code by a computer. Additionally, an OS or the like, which is running on a computer, performs part or the whole of actual processing in accordance with instructions of the program code. A case in which the functions of the above-described embodiment are realized by the processing is also included.

Furthermore in this specification, processing steps describing time sequential processing may include, as well as processes executed in a time-sequential manner in accordance with the written order, processes executed in parallel or individually (for example, parallel processes or object-based processes), which may not necessarily be executed in time sequence.

Furthermore, the configuration and the processing described in the claims of the present disclosure are not limited to the above-described embodiment. It should be understood, of course, by those skilled in the art that various modifications, combinations, and other embodiments may be made according to the design or other elements insofar as they come within the scope of the claims, or the equivalence thereof.

Furthermore, the present disclosure can also take the following configuration.

(1) An information processing apparatus comprising: a display; a position input unit stacked on or integrally formed with the display, the position input unit detecting a position of a received user input and outputting position information based on the detected position; a wireless interface that performs wireless communication; an image capturing unit that captures an image; a storage unit configured to store data; and a processor that controls the display to display the captured image at a first portion of the display; detects whether an image of a specific pattern exists in the captured image; controls the display to display an image corresponding to data stored in the storage unit or data that exists in a network in a second portion of the display; and receives position information from the position input unit indicating that a user input was received at a first position corresponding to the first portion of the display and a second position corresponding to the second portion of the display; and controls the wireless interface to transmit data corresponding to an image displayed at the first position to another information processing apparatus corresponding to the captured image displayed at the second position.

(2) The information processing apparatus of (1), wherein the position input unit is a touch panel that detects a touch input as the user input.

(3) The information processing apparatus of (1) or (2), wherein the image capturing unit captures subject light at a predetermined frame rate, photoelectrically converts the subject light and outputs an image signal obtained by the photoelectric conversion.

(4) The information processing apparatus of any one of (1) to (3), wherein the processor detects whether the image of the specific pattern exists in the captured image based on the image signal output from the image capturing unit.

(5) The information processing apparatus of (1) to (4), wherein the image of the specific pattern detected by the processor is an image transmitted in advance by the wireless interface to the another information processing apparatus.

(6) The information processing apparatus of (1) to (5), wherein the processor manages the image of the specific pattern in association with identification information of the another information processing apparatus to which the image of the specific pattern has been transmitted.

(7) The information processing apparatus of (1) to (6), wherein the identification information of the another information processing apparatus includes at least one of a Media Access Control (MAC) address and a Service Set Identifier (SSID).

(8) The information processing apparatus of (1) to (7), wherein the processor controls the wireless interface to transmit data to the another information processing apparatus based on the association between the image of the specific pattern and the identification of the another information processing apparatus.

(9) The information processing apparatus of (1) to (8), wherein the position information received from the position input unit indicates that the user input is a sliding movement in which the first position corresponds to a starting point of the sliding movement and the second input corresponds to an end point of the sliding movement.

(10) The information processing apparatus of (1) to (9), wherein the processor sets image data associated with the data transmitted to the another information processing apparatus as the image of the specific pattern upon controlling the wireless interface to transmit the data to the another information processing apparatus.

(11) The information processing apparatus of (1) to (10), wherein the processor controls the display to move the image displayed at the first position so as to track the sliding movement corresponding to the user input.

(12) The information processing apparatus of (1) to (11), wherein the processor controls the display to change a color of a frame on a perimeter of the image displayed at the first position when the image reaches the second portion of the display as a result of the movement tracking the sliding operation.

(13) The information processing apparatus of claim (1) to (12), wherein the processor controls the display to change the captured image displayed at the second position to the image displayed at the first position upon completion of the sliding operation.

(14) The information processing apparatus of (1) to (13), wherein the processor controls the display to apply a predetermined visual effect to the image displayed at the first position upon receiving the position information from the position input unit indicating that a user input was received.

(15) The information processing apparatus of (1) to (14), wherein the information processing apparatus is one of a mobile phone, a personal computer, a tablet, a music player and a camera.

(16) An information processing method performed by an information processing apparatus, the method comprising: detecting a position of a received user input at a position input unit stacked on or integrally formed with a display and outputting position information based on the detected position; capturing an image by an image capturing unit of the information processing apparatus; controlling, by a processor of the information processing apparatus, the display to display the captured image at a first portion of the display; detecting, by the processor, whether an image of a specific pattern exists in the captured image; controlling, by the processor, the display to display an image corresponding to data stored in a storage unit or data that exists in a network in a second portion of the display; receiving, by the processor from the position input unit, position information indicating that a user input was received at a first position corresponding to the first portion of the display and a second position corresponding to the second portion of the display; and controlling, by the processor, a wireless interface of the information processing apparatus to transmit data corresponding to an image displayed at the first position to another information processing apparatus corresponding to the captured image displayed at the second position.

(17) A non-transitory computer-readable medium including computer-program instructions, which when executed by an information processing apparatus, cause the information processing apparatus to perform a process comprising: detecting a position of a received user input at a position input unit stacked on or integrally formed with a display and outputting position information based on the detected position; capturing an image; controlling the display to display the captured image at a first portion of the display; detecting whether an image of a specific pattern exists in the captured image; controlling the display to display an image corresponding to data stored in a storage unit or data that exists in a network in a second portion of the display; detecting that a user input was received at a first position corresponding to the first portion of the display and a second position corresponding to the second portion of the display; and controlling a wireless interface of the information processing apparatus to transmit data corresponding to an image displayed at the first position to another information processing apparatus corresponding to the captured image displayed at the second position.

The invention claimed is:
1. An information processing system comprising:
a position input detector, the position input detector detects a position of a received user input and outputs position information based on the detected position;
a wireless interface that performs wireless communication;
an image capturing device that captures an image;
a storage configured to store data including at least one image of a specific pattern in association with identification information of an external display device to which the information processing system is communicatively paired with and to which the image of the specific pattern has been transmitted in advance, wherein the identification information of the external display device includes at least network address information; and
processing circuitry that
detects whether the external display device displays a same image of the specific pattern in the captured image when a field of view of the image capturing device includes the external display device;
controls presentation of a selection of a data object when the same image of the specific pattern is detected to be displayed by the external display device;
receives position information from the position input detector indicating that a user input was received at a position for selection of the data object and moved in a predetermined direction that corresponds to a movement towards the external display device; and
controls the wireless interface to transmit data corresponding to the data object to the external display device in response to the movement of the user input in the predetermined direction.

2. The information processing system of claim 1, wherein the position input detector is a touch panel that detects a touch input as the user input.

3. The information processing system of claim 1, wherein the image capturing device captures subject light at a predetermined frame rate, photoelectrically converts the subject light and outputs an image signal obtained by the photoelectric conversion.

4. The information processing system of claim 3, wherein the processing circuitry detects whether the image of the specific pattern exists in the captured image based on the image signal output from the image capturing device.

5. The information processing system claim 1, wherein the identification information of another information processing apparatus includes at least one of a Media Access Control (MAC) address and a Service Set Identifier (SSID).

6. The information processing system of claim 1, wherein the processing circuitry controls the wireless interface to transmit data to the external display device based on an association between the image of the specific pattern and the identification of the external display device.

7. The information processing system of claim 1, wherein the position information received from the position input detector indicates that the user input is a sliding movement.

8. The information processing system of claim 1, wherein the processing circuitry sets image data associated with the data transmitted to the external display device as the image of the specific pattern upon controlling the wireless interface to transmit the data to the external display device.

9. The information processing apparatus of claim 1, wherein
the information processing system includes one of a mobile phone, a personal computer, a tablet, a music player and a camera.

10. An information processing method performed by an information processing system, the method comprising:
storing, by a storage of the information processing system, data including at least one image of a specific pattern in association with identification information of an external display device to which the information processing system is communicatively paired with and to which the image of the specific pattern has been transmitted in advance, wherein the identification information of the external display device includes at least network address information;
detecting a position of a received user input at a position input detector stacked on or integrally formed with a display and outputting position information based on the detected position;
capturing, an image by an image capturing device of the information processing system;
controlling, by processing circuitry of the information processing system, the display to display the captured image at a first portion of the display;
detecting, by the processing circuitry, whether the external display device displays a same image of the specific pattern in the captured image when a field of view of the image capturing device includes the external display device;
controlling, by the processing circuitry, presentation of a selection of a data object when the same image of the specific pattern is detected to be displayed by the external display device;
receiving, by the processing circuitry from the position input detector, position information indicating that a user input was received at a position for selection of the data object and moved in a predetermined direction that corresponds to a movement towards the external display device; and
controlling, by the processing circuitry, a wireless interface of the information processing system to transmit data corresponding to the data object to the external display device in response to the movement of the user input in the predetermined direction.

11. A non-transitory computer-readable medium including computer-program instructions, which when executed by an information processing system, cause the information processing system to perform a process comprising:
storing, by a storage of the information processing system, data including at least one image of a specific pattern in association with identification information of an external display device to which the information processing system is communicatively paired with and to which the image of the specific pattern has been transmitted in advance, wherein the identification information of the external display device includes at least network address information;
detecting a position of a received user input at a position input detector stacked on or integrally formed with a display and outputting position information based on the detected position;
capturing an image;
controlling the display to display the captured image at a first portion of the display;
detecting whether the external display device displays a same image of the specific pattern in the captured image when a field of view of the image capturing device includes the external display device;
controlling presentation of a selection of a data object when the same image of the specific pattern is detected to be displayed by the external display device;
detecting that a user input was received at a position for selection of the data object and moved in a predetermined direction that corresponds to a movement towards the external display device; and
controlling a wireless interface of the information processing system to transmit data corresponding to the data object to the external display device in response to the movement of the user input in the predetermined direction.

* * * * *